US012628033B2

(12) United States Patent
Das et al.

(10) Patent No.: US 12,628,033 B2
(45) Date of Patent: May 12, 2026

(54) APPARATUS, SYSTEM, AND METHOD OF COMMUNICATING CELLULAR QUALITY OF SERVICE (QoS) INFORMATION

(71) Applicant: Intel Corporation, Santa Clara, CA (US)

(72) Inventors: Dibakar Das, Hillsboro, OR (US); Necati Canpolat, Beaverton, OR (US); Dave Cavalcanti, Beaverton, OR (US); Ganesh Venkatesan, Hillsboro, OR (US); Roya Doostnejad, Los Altos, CA (US); Laurent Cariou, Milizac (FR)

(73) Assignee: INTEL CORPORATION, Santa Clara, CA (US)

( * ) Notice: Subject to any disclaimer, the term of this patent is extended or adjusted under 35 U.S.C. 154(b) by 230 days.

(21) Appl. No.: 18/399,512

(22) Filed: Dec. 28, 2023

(65) Prior Publication Data

US 2024/0314624 A1     Sep. 19, 2024

Related U.S. Application Data

(63) Continuation of application No. 18/186,184, filed on Mar. 19, 2023.

(51) Int. Cl.
| | |
|---|---|
| *H04W 28/02* | (2009.01) |
| *H04W 28/12* | (2009.01) |
| *H04W 84/12* | (2009.01) |

(52) U.S. Cl.
CPC ....... *H04W 28/0268* (2013.01); *H04W 28/12* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 11,146,333 | B2 * | 10/2021 | Rahman | .............. H04L 41/5003 |
| 11,343,699 | B2 * | 5/2022 | Huang-Fu | ......... H04W 28/0257 |
| 2019/0222489 | A1 * | 7/2019 | Shan | ..................... H04M 15/66 |
| 2020/0412454 | A1 * | 12/2020 | Rahman | .......... H04B 10/25752 |
| 2021/0282163 | A1 * | 9/2021 | Wu | ..................... H04W 72/569 |

(Continued)

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Ayaz R Sheikh
(74) *Attorney, Agent, or Firm* — Shichrur & Co.

(57) ABSTRACT

For example, an apparatus may be configured to cause wireless communication station (STA) to set a cellular Quality of Service (QoS) index value in a cellular QoS index field to indicate a predefined setting of a set of a plurality QoS parameters for a cellular QoS traffic flow to be communicated by the STA over a Wireless Local Area Network (WLAN). For example, the apparatus may be configured to cause the STA to transmit a Stream Classification Service (SCS) request to an Access Point (AP) of the WLAN, the SCS request including an SCS descriptor element, the SCS descriptor element including the cellular QoS index field.

20 Claims, 8 Drawing Sheets

702

Process at an Access Point (AP) a Stream Classification Service (SCS) descriptor element in an SCS request from a non-AP wireless communication station (STA) to identify a cellular Quality of Service (QoS) index value in a cellular QoS index field in the SCS descriptor element

704

Determine, based on the cellular QoS index value, a predefined setting of a set of a plurality of QoS parameters for a cellular QoS traffic flow to be communicated by the non-AP STA over the WLAN

706

Schedule one or more communications in the WLAN based on the predefined setting of the set of the plurality of QoS parameters

(56) References Cited

U.S. PATENT DOCUMENTS

| | | | | |
|---|---|---|---|---|
| 2021/0329499 | A1* | 10/2021 | Canpolat | H04L 63/164 |
| 2022/0224495 | A1* | 7/2022 | Canpolat | H04W 28/24 |
| 2022/0330277 | A1* | 10/2022 | Canpolat | H04W 28/24 |
| 2023/0060623 | A1* | 3/2023 | Wang | H04L 41/16 |
| 2023/0127299 | A1* | 4/2023 | Eisen | H04W 28/0268 |
| | | | | 370/338 |
| 2023/0232274 | A1 | 7/2023 | Das et al. | |
| 2024/0015779 | A1* | 1/2024 | Henry | H04L 65/80 |

OTHER PUBLICATIONS

3GPP TS 23.501 V18.0.0 (Dec. 2022) , 3rd Generation Partnership Project; Technical Specification Group Services and System Aspects; System architecture for the 5G System (5GS); Stage 2 (Release 18), 593 pages.
Wi-Fi QoS Management™ Specification, Version 2.0, 2021 Wi-Fi Alliance, 23 pages.

\* cited by examiner

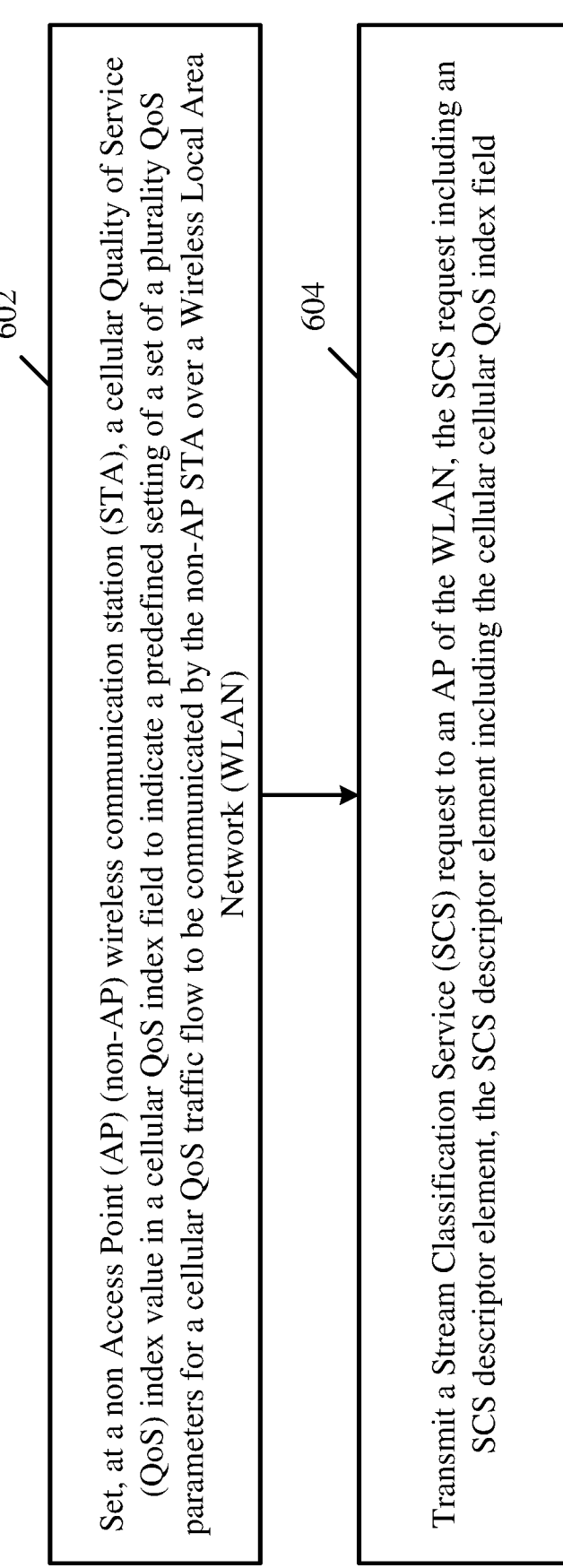

Set, at a non Access Point (AP) (non-AP) wireless communication station (STA), a cellular Quality of Service (QoS) index value in a cellular QoS index field to indicate a predefined setting of a set of a plurality QoS parameters for a cellular QoS traffic flow to be communicated by the non-AP STA over a Wireless Local Area Network (WLAN)

602

Transmit a Stream Classification Service (SCS) request to an AP of the WLAN, the SCS request including an SCS descriptor element, the SCS descriptor element including the cellular cellular QoS index field

APPARATUS, SYSTEM, AND METHOD OF COMMUNICATING CELLULAR QUALITY OF SERVICE (QoS) INFORMATION

TECHNICAL FIELD

Aspects described herein generally relate to communicating cellular Quality of Service (QoS) information.

BACKGROUND

Devices in a wireless communication system may be configured to communicate according to communication protocols, which may be configured to support high-throughput data for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6 is a schematic flow-chart illustration of a method of communicating cellular QoS information, in accordance with some demonstrative aspects.

DETAILED DESCRIPTION

Figure 1:
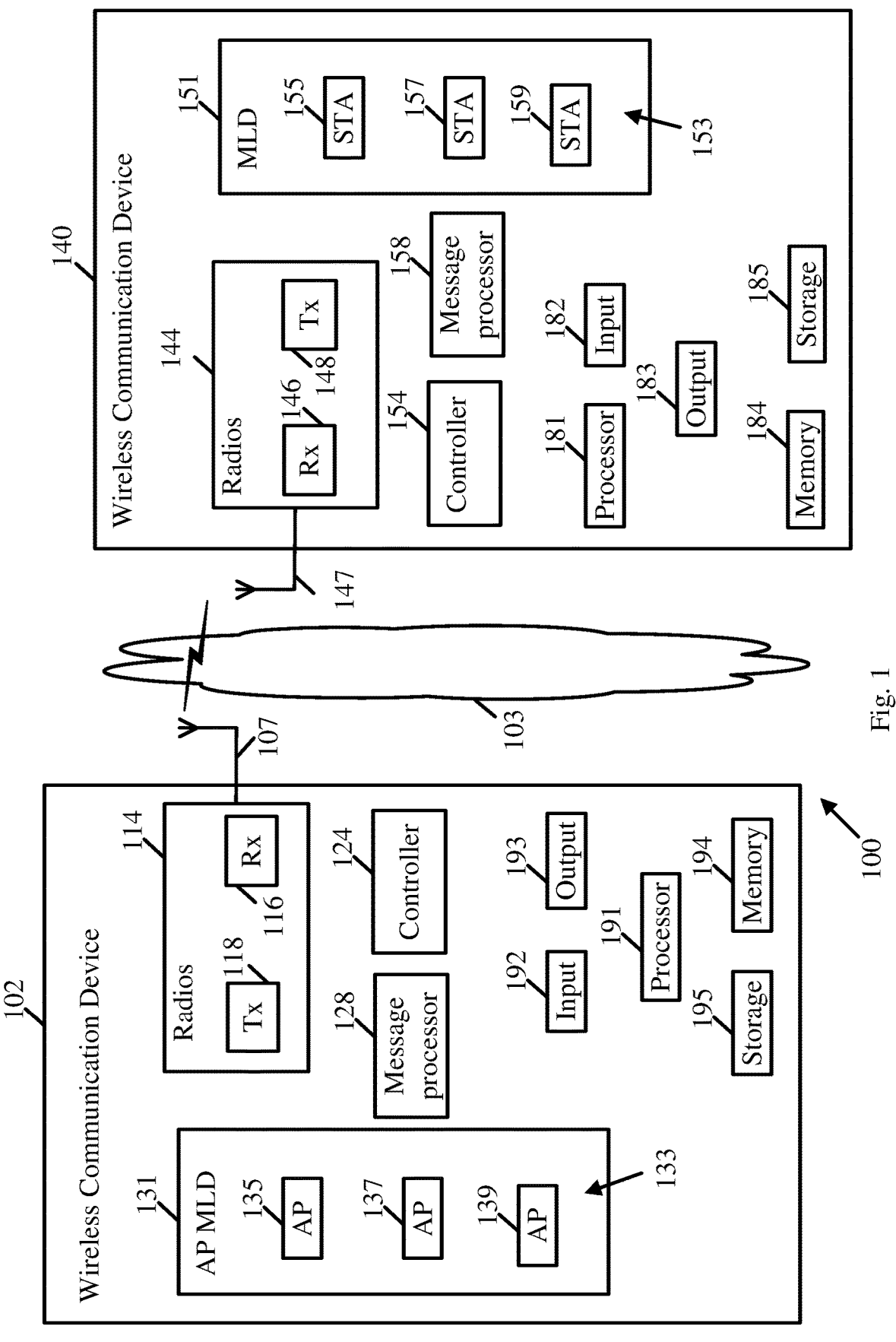
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part* 11: *Wireless LAN Medium Access Control* (*MAC*) *and Physical Layer* (*PHY*) *Specifications*, December 2020); and/or IEEE 802.11be (*IEEE P802.11be/ D2.0 Draft Standard for Information technology—Telecommunications and information exchange between systems Local and metropolitan area networks—Specific requirements; Part* 11: *Wireless LAN Medium Access Control* (*MAC*) *and Physical Layer* (*PHY*) *Specifications; Amendment* 8: *Enhancements for extremely high throughput* (*EHT*), May 2022)) and/or future versions and/or derivatives thereof, devices and/or networks operating in accordance with existing Wi-Fi Specifications (including *Wi-Fi QoS Management™ Specification Version* 2.0, 21 Oct. 2021) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (SIG) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an SIG band, and/or any other band.

In some demonstrative aspects, radios 114 and/or 144 may include, or may be associated with one or more antennas.

In some demonstrative aspects, device 102 may include one or more antennas 107, and/or device 140 may include one or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless non-AP STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more *IEEE* 802.11 *Specifications*, e.g., an *IEEE* 802.11-2020 *Specification*, an *IEEE* 802.11*be Specification*, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
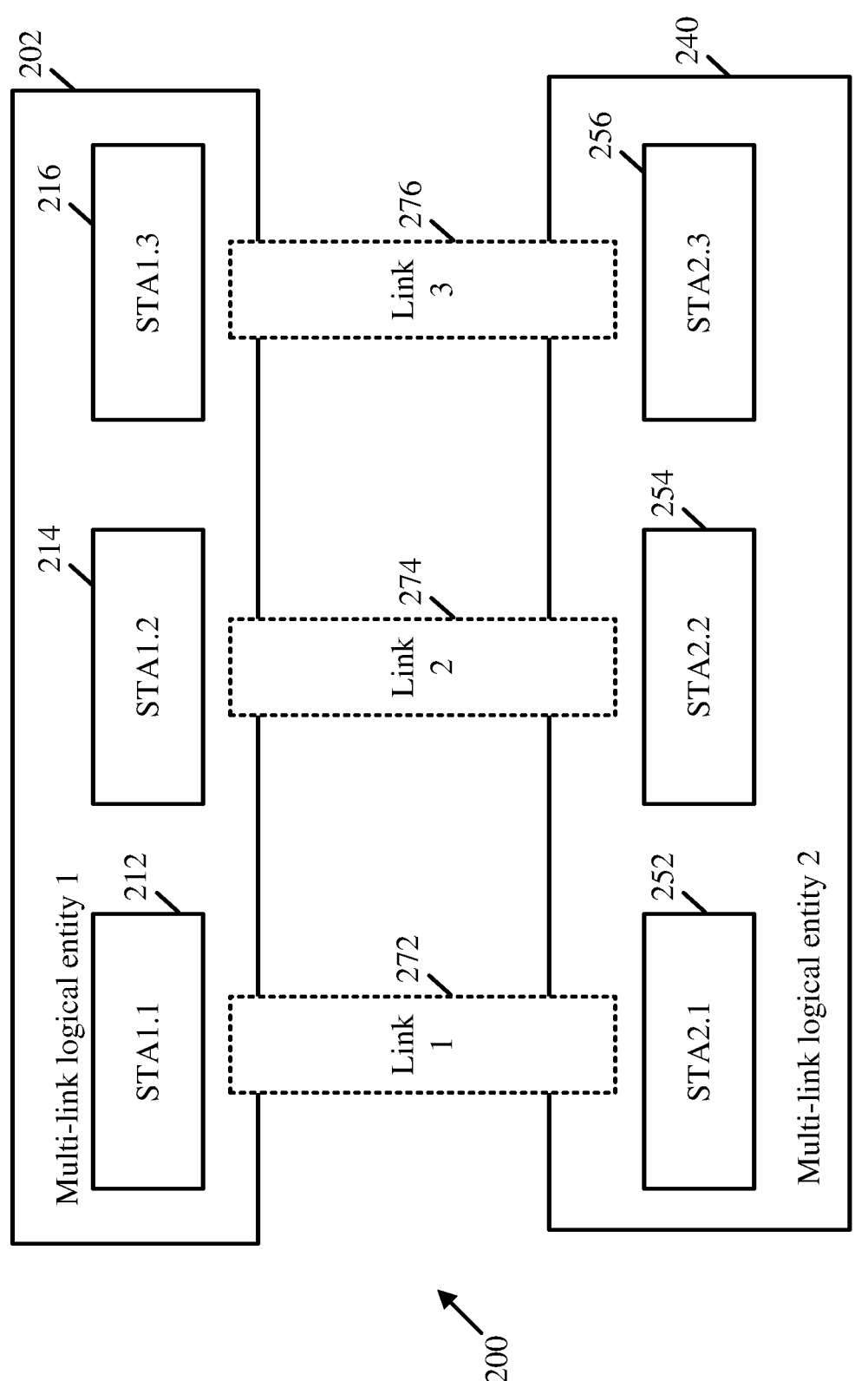
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
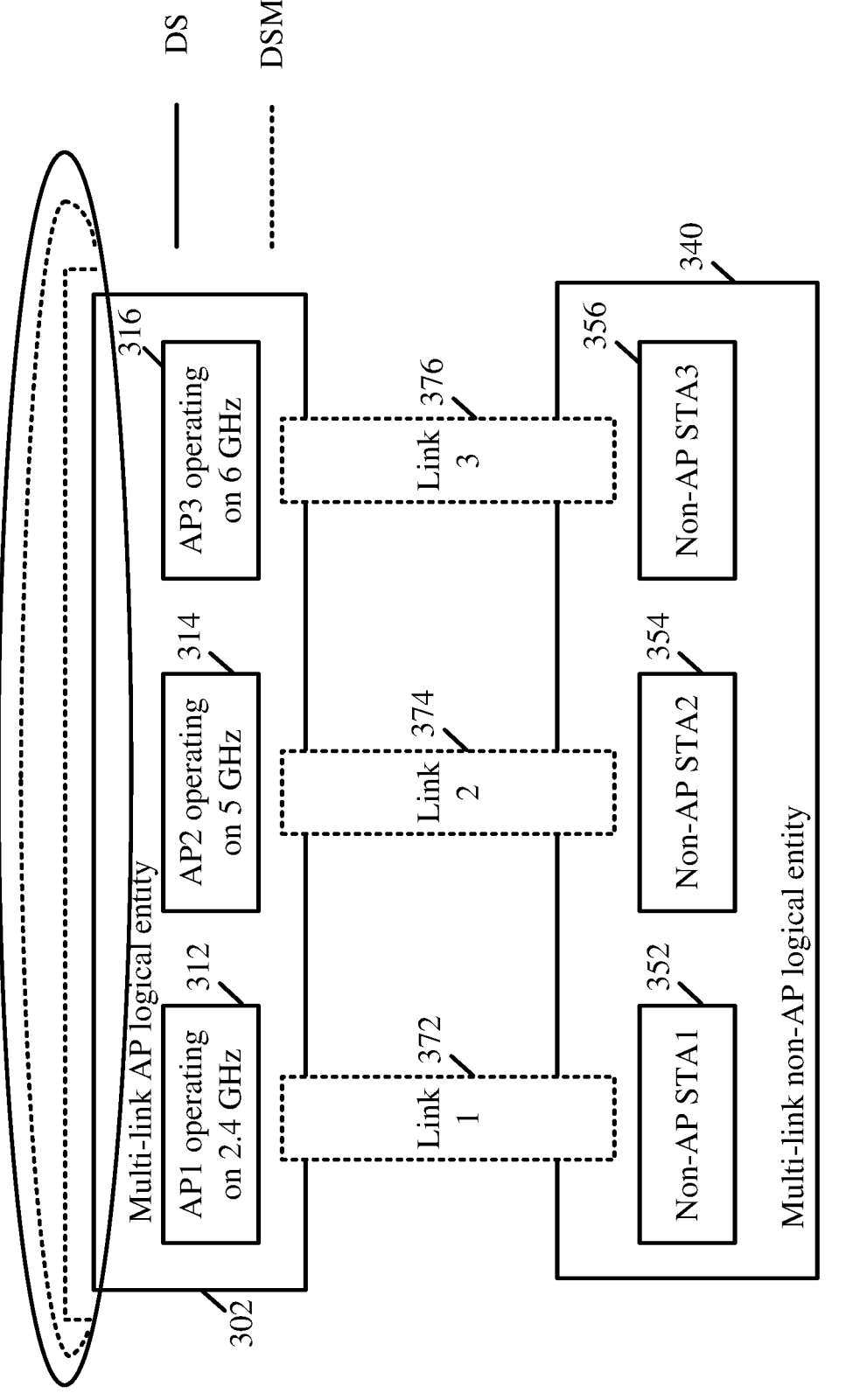
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to implement one or more mechanisms to provide a technical solution to support wireless communication with improved and/or reduced latency, e.g., as described below.

In some demonstrative aspects, devices 102 and/or 140 may be configured to implement one or more mechanisms to provide a technical solution to support improved cellular Quality of Service (QoS) management for wireless communication, e.g., as described below.

In some demonstrative aspects, reduced latency and/or QoS management may be achieved, for example, by designing low-latency channel access schemes, e.g., utilizing scheduling and/or any other mechanism.

For example, one or more schemes may be configured, e.g., in accordance with an *IEEE 802.11be Specification*, for example, on top of multi-user (MU) scheduling mechanisms, e.g., in accordance with an *IEEE 802.11ax Specification*.

In one example, multi-link operations, e.g., according to an MLD architecture, may be implemented to provide a higher channel access opportunity.

In some demonstrative aspects, devices 102 and/or 140 may be configured to implement one or more cellular QoS mechanisms to provide a technical solution to support improved cellular QoS management for wireless communication, e.g., as described below.

For example, the cellular QoS mechanisms may be configured to provide a technical solution to support efficient mapping between one or more cellular QoS parameters and one or more equivalent parameters.

In one example, a cellular QoS mechanism may be configured to support efficient mapping of one or more 3GPP QoS parameters, e.g., which may be captured in a 5G QoS characteristics element, for example, to one or more equivalent Wi-Fi-specific QoS parameters. For example, the mapping between the cellular QoS parameters and the Wi-FI QoS parameters may provide a technical solution to support one or more QoS flows to be seamlessly moved between Wi-Fi networks and 3GPP networks, e.g., without substantially sacrificing performance.

In one example, the one or more 3GPP QoS parameters captured in the 5G QoS characteristics element may include one or more of the following characteristics, for example, in accordance with a 3GPP specification:

TABLE 1

| 5G QoS Characteristic | Description |
|---|---|
| Resource Type | Guaranteed Bit Rate (GBR), Delay-critical GBR or Non-GBR |
| Priority Level | Indicates a priority in scheduling resources among QoS Flows |
| Packet Delay Budget (PDB) | Defines an upper bound for the time that a packet may be delayed between the UE and the UPF that terminates the N6 interface |
| Packet Error Rate (PER) | Defines an upper bound for the rate of PDUs, e.g. IP packets, that have been processed by the sender of a link layer protocol, e.g., RLC in RAN of a 3GPP access, but that are not successfully delivered by the corresponding receiver to the upper layer, e.g., PDCP in RAN of a 3GPP access. Thus, the PER defines an upper bound for a rate of non-congestion related packet losses |
| Averaging Window | Represents the duration over which the bitrate, e.g., GFBR and MFBR, may be calculated. |
| Maximum Data Burst Volume (MDBV) | The largest amount of data that the 5G-AN is required to serve within the period of the 5G-AN part of the PDB. GBR QoS Flows with Delay-critical Resource Type shall be associated with a MDBV. The MDBV aids the 5G-AN to enable low latency requirements as whether a low latency can be achieved with a certain reliability depends on packet size and inter-arrival rate of the packets |

In other aspects, the one or more 3GPP QoS parameters captured in the 5G QoS characteristics element may include any other additional and/or alternative characteristics.

For example, the 3GPP QoS parameters may be conveyed from a core network to an Access Network (AN), e.g., either explicitly or implicitly.

For example, the 3GPP QoS parameters may be provided, for example, using a cellular QoS index (also referred to as a "fifth generation (5G) QoS Index (5QI)"), which may be defined in a table of standardized 5G QoS characteristics sets.

For example, a WiFi QoS signaling mechanism, e.g., which may be implemented from Wi-Fi-6 onwards, may be based on Stream Classification Service (SCS) mechanisms. For example, a STA may signal QoS parameters in an SCS request frame.

In one example, an SCS request frame for a traffic flow may include packet classification parameters and a QoS characteristics element, which may include traffic characteristics information for the traffic flow.

For example, the one or more cellular QoS parameters may be mapped to one or more corresponding QoS characteristics, for example, to provide a technical solution to maintain parity of QoS flows between 3GPP and WiFi.

For example, a mapping may be defined between the 3GPP parameters and the Wi-Fi QoS characteristics, e.g., as follows:

TABLE 2

| 3GPP 5G QoS parameter | Equivalent Wi-Fi QoS Characteristics/parameter |
|---|---|
| Resource Type (GBR/Non-GBR/Delay-critical GBR) | May be converted as: Use Alternate queues with higher UP for GBR/Delay-Critical GBR flows; and/or lower UP for Non-GBR flows for AC_VO & AC_VI, to prioritize GBR flows over Non-GBR flows for AC_VO/VI. Delay-critical GBR - Set 'drop eligible' implying packets can be dropped after delay bound is crossed. |
| Priority Level | Note: This may not be the same as UP. The Priority level may be introduced as a new attribute for Wi-Fi QoS to allow AP to prioritize among different flows |
| Packet Delay Budget | Map to "Delay Bound" in 802.11be QoS Characteristics element. Subtract 5G Core-Network-PDB before mapping per values defined in TS 23.501 for different 5QIs. |
| Packet Error Rate | Map to "MSDU Delivery Ratio" in 802.11be QoS Characteristics. For example, PER may be converted to MSDU Delivery Ratio per Table (3) below. |
| Maximum Data Burst Volume | Map to "Burst Size" in 802.11be QoS Characteristics element. |
| Default Averaging Window | May not be needed for Wi-Fi |
| GBR/Delay-critical GBR - GFBR | Map to "Minimum Data Rate" in 802.11be QoS Characteristics element. |
| GBR/Delay-critical GBR - Avg (GFBR + MFBR) | Map to "Mean Data Rate" in 802.11be QoS Characteristics element. |

In other aspects, any other additional and/or alternative mapping may be defined between one or more additional or alternative 3GPP parameters and one or more additional or alternative Wi-Fi QoS characteristics.

In one example, the packet error rate may be mapped to the "MSDU Delivery Ratio", for example, according to the following table, e.g., as follows:

TABLE 3

| Value | MSDU delivery ratio |
|---|---|
| 0 | Not specified |
| 1 | 95% |
| 2 | 96% |
| 3 | 97% |
| 4 | 98% |
| 5 | 99% |
| 6 | 99.9% |
| 7 | 99.99% |
| 8 | 99.999% |
| 9 | 99.9999% |
| 10-15 | Reserved |

In other aspects, any other additional and/or alterative mapping may be applied between the packet error rate and the "MSDU Delivery Ratio".

In some demonstrative aspects, devices 102 and/or 140 may be configured to implement a cellular QoS signaling mechanism, which may be configured to provide a technical solution to support signaling of one or more cellular QoS parameters of a cellular QoS traffic flow, e.g., as described below.

In some demonstrative aspects, the cellular QoS signaling mechanism may be configured to provide a technical solution to support signaling of one or more cellular QoS parameters, which may not have representation in a current version of a WiFi QoS characteristics element, e.g., as described below.

In some demonstrative aspects, the cellular QoS signaling mechanism may be configured to signal one or more cellular QoS parameters, e.g., of a 5QI-related signaling, for example, in SCS request and/or SCS response frames, e.g., as described below.

In some demonstrative aspects, the cellular QoS signaling mechanism may be configured to enhance an SCS mechanism, e.g., in accordance with an *IEEE* 802.11*be Specification*, for example, to allow a STA to signal the cellular QoS parameters, e.g., as described below.

In some demonstrative aspects, the cellular QoS signaling mechanism may be configured to support 5QI related signaling inside an SCS request frame and/or an SCS response frame, e.g., as described below.

In some demonstrative aspects, an SCS request frame may be configured to include a QoS characteristics element, which may be configured to include additional information, e.g., the 5QI related signaling, for example, to unambiguously signal one or more, e.g., some or all, parameters covered in 3GPP QoS characteristics, e.g., as described below.

In some demonstrative aspects, devices 102 and/or 140 may be configured to perform one or more operations and/or communications to support the cellular QoS signaling mechanism based on a cellular QoS index, e.g., as described below.

In some demonstrative aspects, an application and/or an OS, e.g., executed by device 102 and/or device 140, may be configured to indicate an index, e.g., a cellular QoS index, of a standardized traffic characteristic, e.g., as described below.

In some demonstrative aspects, a STA and/or an AP, e.g., a STA and/or AP implemented by device 102 and/or device 140, may be configured to communicate to its peer STA/AP the cellular QoS index for a cellular QoS traffic flow, e.g., as described below.

In some demonstrative aspects, devices 102 and/or 140 may be configured to utilize the cellular QoS index, for example, to provide a technical solution to support a standardized way to map cellular QoS characteristics, and/or to signal the cellular QoS characteristics in a network, e.g., as described below.

For example, devices 102 and/or 140 may be configured to implement the cellular QoS index to provide a technical solution to support better coexistence among different vendors, and/or to improve resource allocation, e.g., scheduling, which, in turn, may enhance a QoS experience for end-users.

For example, devices 102 and/or 140 may be configured to implement the cellular QoS index to provide a technical solution to support improved internetworking between cellular technologies, e.g., 5G/6G technologies, and WLAN technologies, e.g., WiFi technologies.

In one example, a STA may be connected to a cellular network, e.g., over a trusted or untrusted WLAN link. For example, standardized traffic characteristics corresponding to WLAN traffic characteristics of an application stream may be mapped to corresponding standardized cellular indexes, e.g., 5QI values. Accordingly, an element in the cellular network, e.g., a 5G Core Network (5GC), may leverage the cellular QoS index signaling, for example, to specify the cellular QoS requirements for those applications in the WLAN link.

For example, devices 102 and/or 140 may be configured to implement the cellular QoS index to provide a technical solution to support a convenient mechanism for applications to signal cellular QoS information. For example, devices 102 and/or 140 may be configured to identify a predefined setting of a set of a plurality of QoS parameters based on the cellular QoS index, e.g., without having to go through filling out one or more specific fields.

In some demonstrative aspects, devices 102 and/or 140 may be configured to generate, process and/or communicate a cellular QoS index, the 5QI, e.g., as described below.

In some demonstrative aspects, the cellular QoS index may be configured to indicate a predefined setting of a set of a plurality QoS parameters for a cellular QoS traffic flow, e.g., as escribed below.

In some demonstrative aspects, the cellular QoS index may be defined, generated and/or provided by an application and/or an OS executed by a device, e.g., device 102 and/or device 140, as described below.

In some demonstrative aspects, devices 102 and/or 140 may be configured to generate, process and/or communicate one or more frames and/or messages based on a cellular QoS index, e.g., as described below.

In some demonstrative aspects, devices 102 and/or 140 may be configured to generate, process and/or communicate one or more frames and/or messages including a cellular QoS index, e.g., as described below.

In some demonstrative aspects, devices 102 and/or 140 may be configured to generate, process and/or communicate one or more frames and/or messages including one or more information elements, which are based on a cellular QoS index, e.g., as described below.

In some demonstrative aspects, a plurality of predefined settings of a set of a plurality QoS parameters for a cellular QoS traffic flow, e.g., corresponding to typical types and/or settings of traffic streams may be defined, and may be known, e.g., a-priori, at some or all STAs. For example, the set of QoS traffic parameters may have an associated index, e.g., a 5QI.

In some demonstrative aspects, an AP, e.g., implemented by device 102, may be configured to receive and process a request for communication of a cellular QoS traffic flow, e.g., including the 5QI.

In some demonstrative aspects, for example, based on receipt of the 5QI, the AP may determine a predefined setting from the plurality of predefined settings.

In some demonstrative aspects, device 102 and/or device 140 may be configured to generate, process and/or communicate one or more frames including a cellular QoS index, e.g., the 5QI, to signal cellular QoS characteristics for a cellular QoS traffic flow, e.g., as described below.

In some demonstrative aspects, a non-AP STA, e.g., a non-AP STA implemented by device 140, may be configured to signal cellular QoS information to an AP, for example, in an SCS frame, for example, an SCS request frame, e.g., as described below.

For example, controller 154 may be configured to control a non-AP STA implemented by device 140 to signal cellular QoS information to an AP implemented by device 102, for example, by including the cellular QoS index in a frame, for example, an SCS frame, e.g., as described below.

In some demonstrative aspects, a STA, e.g., a non-AP STA implemented by device 140, may be configured to set a cellular QoS index value, e.g., a 5QI value, in a cellular QoS index field, for example, a 5QI field, e.g., as described below.

In some demonstrative aspects, the cellular QoS index value, e.g., the 5QI value, may be configured to indicate a setting of a set of a plurality of cellular QoS parameters and/or characteristics, e.g., as described below.

In some demonstrative aspects, the cellular QoS index value, e.g., the 5QI value, may be configured to indicate a setting of a set of a plurality of cellular QoS parameters and/or characteristics of a cellular traffic stream to be communicated by the STA, e.g., as described below.

In some demonstrative aspects, the cellular QoS index value, e.g., the 5QI value, may be configured to indicate a setting of a set of a plurality of cellular QoS parameters and/or characteristics of a cellular traffic stream to be communicated between the STA and an AP, e.g., as described below.

In some demonstrative aspects, the cellular QoS index field may be included by a STA in a frame transmitted from the STA to an AP, for example, to indicate a requested setting of a set of cellular QoS parameters and/or characteristics, which is requested by the STA, e.g., as described below.

In some demonstrative aspects, the cellular QoS index value, e.g., the 5QI value, may be configured to indicate a predefined setting of the set of the plurality of QoS parameters and/or characteristics, e.g., as described below.

In some demonstrative aspects, the cellular QoS index value, e.g., the 5QI value, may be configured to indicate a predefined setting of the set of QoS parameters and/or characteristics, for example, from a plurality of predefined settings, e.g., as described below.

In some demonstrative aspects, the cellular QoS index value, e.g., the 5QI value, may be provided to the STA by an application and/or an OS, for example, according to one or more cellular QoS requirements, e.g., as described below.

In some demonstrative aspects, the cellular QoS index value, e.g., the 5QI value, may be determined by the STA, for example, according to one or more cellular QoS requirements, e.g., as described below.

In some demonstrative aspects, the cellular QoS index value, e.g., the 5QI value, may be selected from a plurality of predefined cellular QoS index values, e.g., as described below.

In some demonstrative aspects, the cellular QoS index value, e.g., the 5QI value, may be selected from the plurality of predefined cellular QoS index values, for example, according to one or more cellular QoS requirements and/or parameters, e.g., as described below.

In some demonstrative aspects, the plurality of predefined cellular QoS index values may correspond to a respective plurality of predefined setting of cellular QoS parameters, e.g., as described below.

In some demonstrative aspects, the plurality of predefined cellular QoS index values may correspond to a plurality of different types of cellular traffic, e.g., as described below.

In some demonstrative aspects, the plurality of predefined cellular QoS index values may correspond to a plurality of different types of cellular QoS requirements, e.g., as described below.

In some demonstrative aspects, the plurality of predefined cellular QoS index values may correspond to a plurality of different channel conditions, e.g., as described below.

In other aspects, some or all of the plurality of predefined cellular QoS index values may be defined based on any other additional or alternative criteria.

In some demonstrative aspects, a non-AP STA, e.g., the non-AP STA implemented by device 140, may be configured to transmit a frame including a cellular QoS index field, e.g., as described below.

In some demonstrative aspects, the non-AP STA, e.g., the non-AP STA implemented by device 140, may be configured to transmit the frame including the cellular QoS index field to an AP, e.g., an AP implemented by device 102.

In some demonstrative aspects, the non-AP STA, e.g., the non-AP STA implemented by device 140, may be configured to transmit an SCS frame including the cellular QoS index field, e.g., as described below.

In some demonstrative aspects, the SCS frame may include an SCS request frame, e.g., as described below.

In some demonstrative aspects, the cellular QoS index field may be included in any other additional or alternative type of frame.

In some demonstrative aspects, controller 154 may be configured to control, trigger, instruct, and/or cause a non-AP STA implemented by device 140 to set a cellular QoS index value in a cellular QoS index field, for example, to indicate a predefined setting of a set of a plurality QoS parameters for a cellular QoS traffic flow to be communicated by the non-AP STA over a WLAN, e.g., as described below.

In some demonstrative aspects, the set of the plurality QoS parameters may include at least one of a resource type, a priority level, a Packet Delay Budget (PDB), a Packet Error Rate (PER), an averaging window, and/or a Maximum Data Burst Volume (MDBV), e.g., as described below.

In other aspects, the set of the plurality QoS parameters may include any other additional and/or alternative parameters.

In some demonstrative aspects, controller 154 may be configured to control, trigger, instruct, and/or cause the non-AP STA implemented by device 140 to transmit an SCS request to an AP of the WLAN, e.g., an AP implemented by device 102, e.g., as described below.

In some demonstrative aspects, the SCS request may include an SCS descriptor element, e.g., as described below.

In some demonstrative aspects, the SCS descriptor element may include the cellular QoS index field, e.g., as described below.

In other aspects, the cellular QoS index field may be included in any other SCS descriptor element including any other additional or alternative fields, and/or having any other format.

In some demonstrative aspects, the cellular QoS index field may include a 5QI field, e.g., as described below.

In other aspects, the cellular QoS index field may include any other type of field.

In some demonstrative aspects, the SCS descriptor element may include an element ID field, a length field, e.g., after the element ID field, an SCS ID field, e.g., after the length field, and a request type field, e.g., after the SCSID field, e.g., as described below.

In some demonstrative aspects, the cellular QoS index field may be after the SCSID field, e.g., as described below.

In other aspects, the SCS descriptor element may include any other additional or alternative fields.

In other aspects, the cellular QoS index field may be implemented in any other location in the SCS descriptor element.

In some demonstrative aspects, controller 124 may be configured to control, trigger, instruct, and/or cause an AP implemented by device 102 to process an SCS descriptor element in an SCS request from a non-AP STA, e.g., the SCS request from the non-AP STA implemented by device 140, for example, to identify a cellular QoS index value in a cellular QoS index field in the SCS descriptor element, e.g., as described below.

In some demonstrative aspects, controller 124 may be configured to control, trigger, instruct, and/or cause the AP implemented by device 102 to determine, for example, based on the cellular QoS index value, a predefined setting of a set of the plurality QoS parameters for a cellular QoS traffic flow to be communicated by the non-AP STA, e.g., the non-AP STA implemented by device 140, over the WLAN, e.g., as described below.

In some demonstrative aspects, controller 124 may be configured to control, trigger, instruct, and/or cause the AP implemented by device 102 to schedule one or more communications in the WLAN, for example, based on the predefined setting of the set of the plurality QoS parameters, e.g., as described below.

In some demonstrative aspects, the SCS descriptor element may include a vendor specific element, e.g., as described below.

In some demonstrative aspects, the vendor specific element may include the cellular QoS index field, e.g., as described below.

In some demonstrative aspects, the vendor specific element may include a resource type field, as described below.

In some demonstrative aspects, the resource type field may be configured to indicate a resource type of the cellular QoS traffic flow, e.g., as described below.

In some demonstrative aspects, the vendor specific element may include a priority field, e.g., as described below.

In some demonstrative aspects, the priority field may be configured to indicate a priority of the cellular QoS traffic flow, e.g., as described below.

In some demonstrative aspects, the SCS descriptor element may include a QoS characteristics element, e.g., as described below.

In some demonstrative aspects, the QoS characteristics element may include the cellular QoS index field, e.g., as described below.

In some demonstrative aspects, the QoS characteristics element may include the resource type field, and/or the priority field, e.g., as described below.

In some demonstrative aspects, the SCS descriptor element may include the QoS characteristics element including a delay bound field, which may be configured based on a Packet Delay Budget (PDB) of the cellular QoS traffic flow, e.g., as described below.

In some demonstrative aspects, controller 154 may be configured to control, trigger, instruct, and/or cause the non-AP STA implemented by device 140 to set the delay bound field, for example, based on the PDB of the cellular QoS traffic flow, e.g., as described below.

In some demonstrative aspects, controller 154 may be configured to control, trigger, instruct, and/or cause the non-AP STA implemented by device 140 to set a value in the delay bound field, for example, based on a subtraction result of subtracting a Core Network PDB (CN-PDB) from the PDB of the cellular QoS traffic flow, e.g., as described below.

In some demonstrative aspects, the AP implemented by device 102 may receive the SCS descriptor element including the QoS characteristics element including the delay bound field, e.g., as described below.

In some demonstrative aspects, controller 124 may be configured to control, trigger, instruct, and/or cause the AP implemented by device 102 to determine a PDB of the cellular QoS traffic flow, for example, based on the delay bound field in the QoS characteristics element in the SCS descriptor element, e.g., as described below.

In some demonstrative aspects, the SCS descriptor element may include the QoS characteristics element including a MAC Service Data Unit (MSDU) delivery ratio field, which may be configured based on a Packet Error Rate (PER) of the cellular QoS traffic flow, e.g., as described below.

In some demonstrative aspects, controller 154 may be configured to control, trigger, instruct, and/or cause the non-AP STA implemented by device 140 to set the MSDU delivery ratio field in the QoS characteristics element of the SCE descriptor element, for example, based on a PER of the cellular QoS traffic flow, e.g., as described below.

In some demonstrative aspects, controller 154 may be configured to control, trigger, instruct, and/or cause the non-AP STA implemented by device 140 set a value in the MSDU delivery ratio field, for example, according to a predefined mapping table to map a plurality of predefined PER values to a respective plurality of predefined MSDU delivery ratio values, e.g., as described below.

In one example, the predefined mapping table may be based on one or more elements of Table 3. In other aspects, any other mapping table may be implemented.

In some demonstrative aspects, the AP implemented by device 102 may receive the SCS descriptor element including the QoS characteristics element including the MSDU delivery ratio field, e.g., as described below.

In some demonstrative aspects, controller 124 may be configured to control, trigger, instruct, and/or cause the AP implemented by device 102 to determine a PER of the cellular QoS traffic flow, for example, based on the MSDU delivery ratio field in the QoS characteristics element in the SCS descriptor element, e.g., as described below.

In some demonstrative aspects, the SCS descriptor element may include the QoS characteristics element including a minimum data rate field, which may be configured based on a Guaranteed Flow Bit Rate (GFBR) of the cellular QoS traffic flow, e.g., as described below.

In some demonstrative aspects, controller 154 may be configured to control, trigger, instruct, and/or cause the non-AP STA implemented by device 140 to set the minimum data rate field in the QoS characteristics element of the SCE descriptor element, for example, based on a GFBR of the cellular QoS traffic flow, e.g., as described below.

In some demonstrative aspects, the AP implemented by device 102 may receive the SCS descriptor element including the QoS characteristics element including the minimum data rate field, e.g., as described below.

In some demonstrative aspects, controller 124 may be configured to control, trigger, instruct, and/or cause the AP implemented by device 102 to determine a GFBR of the cellular QoS traffic flow, for example, based on the minimum data rate field in the QoS characteristics element in the SCS descriptor element, e.g., as described below.

In some demonstrative aspects, the SCS descriptor element may include the QoS characteristics element including a mean data rate field, which may be configured based on an average of a GFBR and a Maximal Flow Bit Rate (MFBR) of the cellular QoS traffic flow, e.g., as described below.

In some demonstrative aspects, controller 154 may be configured to control, trigger, instruct, and/or cause the non-AP STA implemented by device 140 to set the mean data rate field in the QoS characteristics element of the SCE descriptor element, for example, based on an average of the GFBR and the MFBR of the cellular QoS traffic flow, e.g., as described below.

In some demonstrative aspects, the AP implemented by device 102 may receive the SCS descriptor element including the QoS characteristics element including the mean data rate field, e.g., as described below.

In some demonstrative aspects, controller 124 may be configured to control, trigger, instruct, and/or cause the AP implemented by device 102 to determine a GFBR of the cellular QoS traffic flow, for example, based on the minimum data rate field in the QoS characteristics element in the SCS descriptor element, e.g., as described below.

In some demonstrative aspects, the SCS descriptor element may include a resource type field, e.g., as described below.

In some demonstrative aspects, controller 154 may be configured to control, trigger, instruct, and/or cause the non-AP STA implemented by device 140 to set a resource type field in the SCS descriptor element to indicate a resource type of the cellular QoS traffic flow, e.g., as described below.

In some demonstrative aspects, controller 154 may be configured to control, trigger, instruct, and/or cause the non-AP STA implemented by device 140 to set the resource type field to a value from a plurality of predefined resource type field values, e.g., as described below.

In some demonstrative aspects, the plurality of predefined resource type field values may include, for example, a first resource type field value to indicate a GBR flow, a second resource type field value to indicate a non-GBR flow, and/or a third resource type field value to indicate a GBR-delay critical flow, e.g., as described below.

In other aspects, the plurality of predefined resource type field values may include any other additional and/or alternative values.

In some demonstrative aspects, the AP implemented by device 102 may receive the SCS descriptor including the resource type field, e.g., as described below.

In some demonstrative aspects, controller 124 may be configured to control, trigger, instruct, and/or cause the AP implemented by device 102 to determine a resource type of the cellular QoS traffic flow, for example, based on the resource type field in the SCS descriptor element, e.g., as described below.

In some demonstrative aspects, controller 124 may be configured to control, trigger, instruct, and/or cause the AP implemented by device 102 to determine the resource type of the cellular QoS traffic flow, for example, based on the value from the plurality of predefined resource type field values, e.g., as described below.

Figure 4:
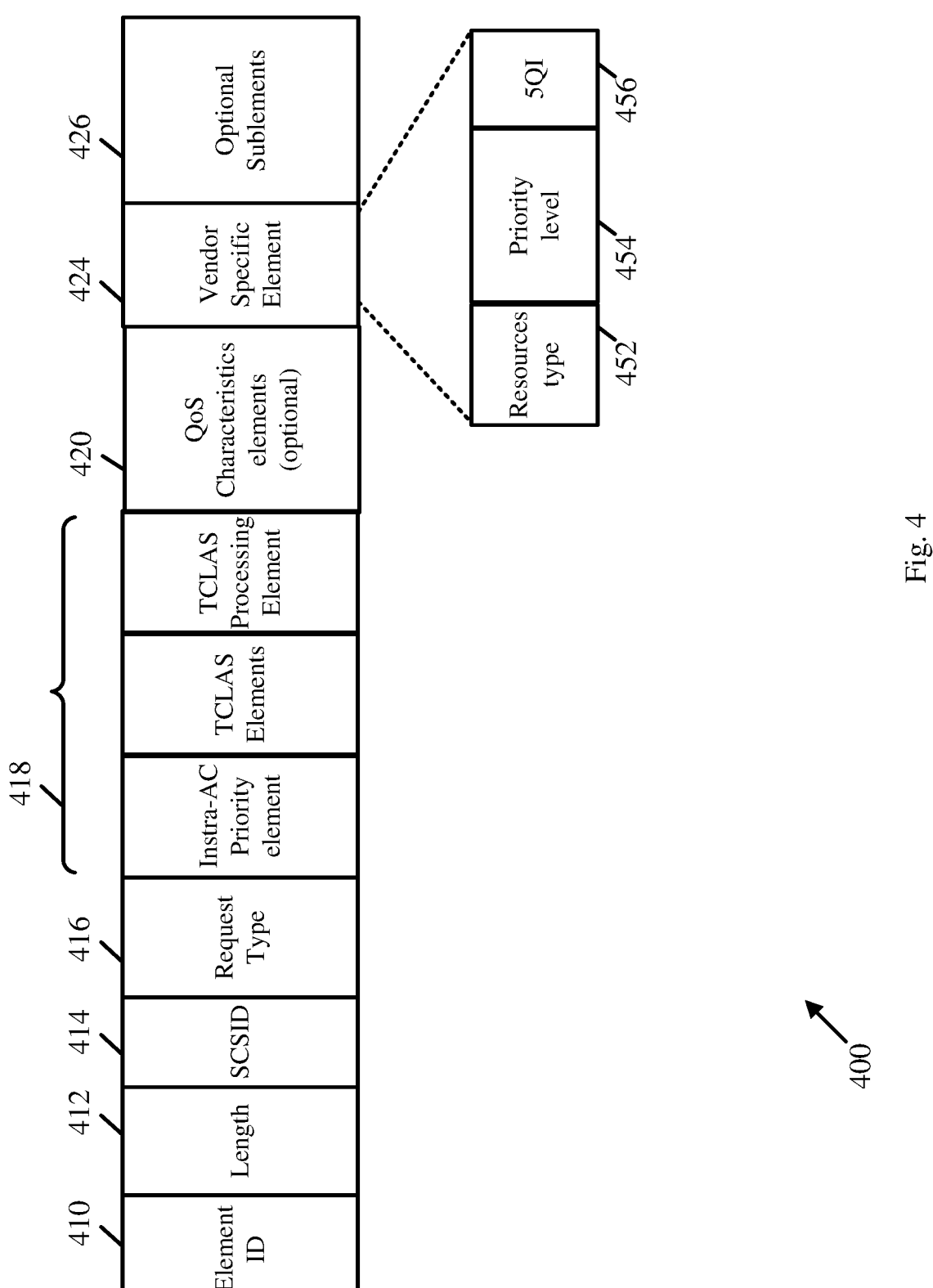
FIG. 4 is a schematic illustration of a Stream Classification Service (SCS) descriptor element, in accordance with some demonstrative aspects.

Reference is made to FIG. 4, which schematically illustrates an SCS descriptor element 400, in accordance with some demonstrative aspects. For example, device 102 (FIG. 1) and/or device 140 (FIG. 1) may be configured to generate, process and/or communicate one or more frames and/or messages including the SCS descriptor element 400.

In some demonstrative aspects, the SCS descriptor element 400 may be communicated in an SCS setup request frame, for example, to support the cellular QoS signaling mechanism.

In some demonstrative aspects, the SCS setup request frame may be communicated in a WLAN between a non-AP STA, e.g., implemented by device 140 (FIG. 1), and an AP of the WLAN, e.g., implemented by device 102 (FIG. 1).

In some demonstrative aspects, the SCS descriptor element 400 may include a cellular QoS index field 456, e.g., a 5QI field 456, to indicate a predefined setting of a set of a plurality QoS parameters for a cellular QoS traffic flow to be communicated by the non-AP STA over the WLAN.

In some demonstrative aspects, as shown in FIG. 4, the SCS descriptor element 400 may include a vendor specific element 424 including the 5QI field 456.

In some demonstrative aspects, as shown in FIG. 4, vendor specific element 424 may include a resource type field 452 ("Resources Type") configured to indicate a resource type of the cellular QoS traffic flow.

In some demonstrative aspects, as shown in FIG. 4, vendor specific element 424 may include a priority field 454 ("Priority Level") configured to indicate a priority of the cellular QoS traffic flow.

In some demonstrative aspects, as shown in FIG. 4, the SCS descriptor element 400 may include an element ID field 410, a length field 412 after the element ID field 410, an SCSID field 414 after the length field 412, a request type field 416 after the SCSID field 414, and one or more predefined parameter elements and/or fields 418 after the request type field 416.

In some demonstrative aspects, as shown in FIG. 4, the vendor specific element 424 may be after the SCSID field 414.

In some demonstrative aspects, as shown in FIG. 4, the SCS descriptor element 400 may include one or more optional/reserved subelements 426, e.g., after the vendor specific element 424.

In some demonstrative aspects, a non-AP STA, e.g., implemented by device 140 (FIG. 1), may be configured to set a cellular QoS index value in 5QI field 456, for example, to indicate the predefined setting of the set of the plurality QoS parameters for the cellular QoS traffic flow, e.g., as described above.

In some demonstrative aspects, an AP, e.g., implemented by device 102 (FIG. 1), may be configured to determine, based on the cellular QoS index value in 5QI field 456, the predefined setting of the set of the plurality QoS parameters to schedule one or more communications in the WLAN, based on the predefined setting of the set of the plurality QoS parameters, e.g., as described above.

In some demonstrative aspects, as shown in FIG. 4, the SCS descriptor element 400 may include one or more QoS characteristics elements 420, e.g., an optional QoS characteristics element, for example, after the one or more predefined parameter elements and/or fields 418.

In some demonstrative aspects, a cellular QoS index field, e.g., a 5QI field, may be implemented as part of a QoS characteristics element, e.g., a QoS characteristics element 420, for example, instead of, or in addition to, 5QI field 456 in the vendor specific element 424, e.g., as described below.

Figure 5:
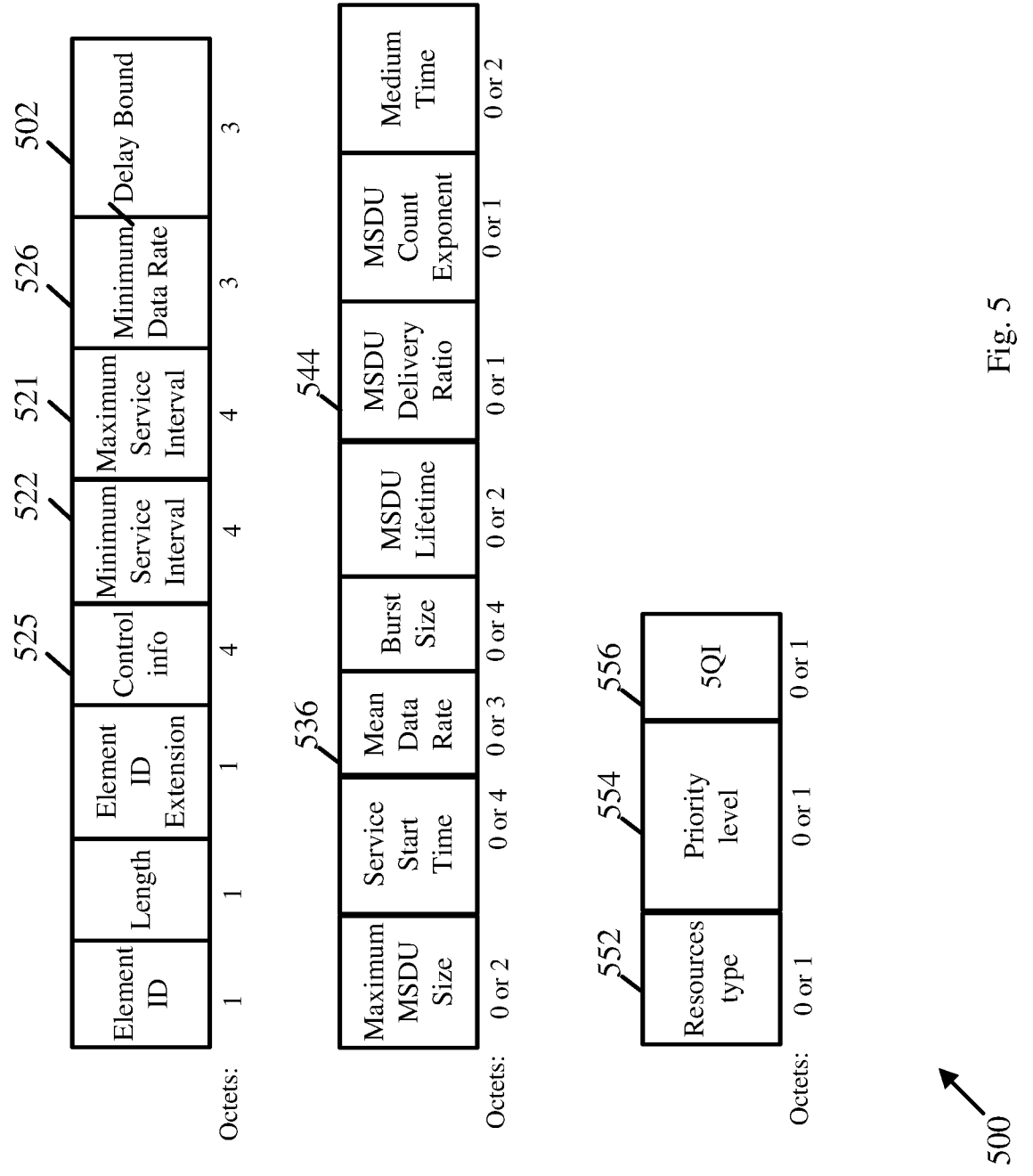
FIG. 5 is a schematic illustration of a Quality of Service (QoS) characteristics element, in accordance with some demonstrative aspects.

Reference is made to FIG. 5, which schematically illustrates a QoS characteristics element 500, in accordance with some demonstrative aspects. For example, device 102 (FIG. 1) and/or device 140 (FIG. 1) may be configured to generate, process and/or communicate one or more frames and/or messages including QoS characteristics element 500.

In some demonstrative aspects, QoS characteristics elements 420 (FIG. 4) may include a QoS characteristics element 500.

In some demonstrative aspects, QoS characteristics element 500 may include information, which may be configured to support and/or may be required to support, setting of one or more, e.g., a plurality of, cellular QoS parameters for a cellular QoS traffic flow.

In some demonstrative aspects, QoS characteristics element 500 may be communicated in an SCS descriptor element, e.g., SCS descriptor element 400 (FIG. 4) in an SCS setup request frame, for example, to support the cellular QoS signaling mechanism.

In some demonstrative aspects, the SCS setup request frame may be communicated in a WLAN between a non-AP STA, e.g., implemented by device 140 (FIG. 1), and an AP of the WLAN, e.g., implemented by device 102 (FIG. 1).

In some demonstrative aspects, as shown in FIG. 5, QoS characteristics element 500 may include a cellular QoS index field 556, e.g., a 5QI field 556, to indicate a predefined setting of a set of a plurality QoS parameters for a cellular QoS traffic flow to be communicated by the non-AP STA over the WLAN.

In some demonstrative aspects, as shown in FIG. 5, QoS characteristics element 500 may include a resource type field 552 ("Resources Type") configured to indicate a resource type of the cellular QoS traffic flow.

For example, resource type field 552 may be set to a value from a plurality of predefined resource type field values, which may include, for example, a first resource type field value to indicate a Guaranteed Bit Rate (GBR) flow, a second resource type field value to indicate a non-GBR flow, and/or a third resource type field value to indicate a GBR-delay critical flow, e.g., as described above.

In some demonstrative aspects, as shown in FIG. 5, QoS characteristics element 500 may include a priority field 554 ("Priority Level") configured to indicate a priority of the cellular QoS traffic flow.

In one example, a priority level value in the priority field 554 may indicate a relative priority among different DL flows, for example, from one or more different non-AP STAs, at the AP.

In some demonstrative aspects, as shown in FIG. 5, the QoS characteristics element 500 may include a delay bound field 502, which may be set, for example, to indicate a Packet Delay Budget (PDB) of the cellular QoS traffic flow, e.g., as described above.

In some demonstrative aspects, as shown in FIG. 5, the QoS characteristics element 500 may include an MSDU delivery ratio field 544, which may be set, for example, to indicate a Packet Error Rate (PER) of the cellular QoS traffic flow, e.g., as described above.

For example, MSDU delivery ratio field 544 may be set to a value according to a predefined mapping table configured to map a plurality of predefined PER values to a respective plurality of predefined MSDU delivery ratio values, e.g., as described above.

In some demonstrative aspects, as shown in FIG. 5, the QoS characteristics element 500 may include a minimum data rate field 526, which may be set to indicate a Guaranteed Flow Bit Rate (GFBR) of the cellular QoS traffic flow, e.g., as described above.

In some demonstrative aspects, as shown in FIG. 5, the QoS characteristics element 500 may include a mean data rate field 536, which may be set to indicate an average of a GFBR and a Maximal Flow Bit Rate (MFBR) of the cellular QoS traffic flow, e.g., as described above.

In some demonstrative aspects, a non-AP STA, e.g., implemented by device 140 (FIG. 1), may be configured to set a cellular QoS index value in 5QI field 556, for example, to indicate the predefined setting of the set of the plurality QoS parameters for the cellular QoS traffic flow, e.g., as described above.

In some demonstrative aspects, an AP, e.g., implemented by device 102 (FIG. 1), may be configured to determine, based on the cellular QoS index value in 5QI field 556, the predefined setting of the set of the plurality QoS parameters to schedule one or more communications in the WLAN, based on the predefined setting of the set of the plurality QoS parameters corresponding to the 5QI value in the 5QI field 556, e.g., as described above.

In some demonstrative aspects, as shown in FIG. 5, QoS Characteristics element may include one or more newly additional fields, e.g., resource type field 552, 5QI field 556, and/or priority level field 554.

In some demonstrative aspects, presence of the additional fields may be signaled, for example, using a reserved bit in a Presence Bitmap of Additional Parameters, e.g., in a control info field 525 in the QoS characteristics element 500.

In some demonstrative aspects, a 5QI value may be explicitly signaled in an SCS descriptor element, e.g., SCS descriptor element 400 (FIG. 4). In one example, the 5QI value may be signaled inside a new field in a QoS Characteristics element, e.g., 5QI field 556 in QoS characteristics element 500. In one example, the 5QI value may be signaled inside a new field in the SCS descriptor element, e.g., 5QI field 456 (FIG. 4) in the SCS descriptor element 400 (FIG. 4), as described above.

In some demonstrative aspects, one or more of parameters corresponding to the 5QI value, e.g., a delay bound value or the like, in the SCS descriptor element, e.g., in the QoS characteristics element 500 included in the SCS descriptor element 400 (FIG. 4), may be reserved or not present, for example, if the parameters corresponding to the 5QI value are the default values.

In some demonstrative aspects, one or more parameters corresponding to the 5QI value, e.g., a delay bound value or the like, in the SCS descriptor element, e.g., in the QoS characteristics element 500 included in the SCS descriptor element 400 (FIG. 4), may be set to non-reserved values, or may be present, for example, to signal non-default values, for example, if the parameters corresponding to the 5QI value are not the default values.

In some demonstrative aspects, a non-AP STA, e.g., implemented by device 140 (FIG. 2), may utilize a field, e.g., a new field, to signal whether or not one or more default parameters associated with the 5QI value are present.

In some demonstrative aspects, a resource type parameter value in a resource type field, e.g., resource type field 552 and/or resource type field 452 (FIG. 4), may be encoded, for example, according to one or more, e.g., some or all, of the definitions in the following table:

TABLE 4

| Resources Type field value | Interpretation |
|---|---|
| 0 (GBR) | Packets for this flow should be prioritized over other flows and should not be dropped. The packets crossing the latency bound should not be count as lost. |
| 1 (non-GBR) | This flow is less prioritized than GBR. |
| 2 (GBR-delay critical) | This flow should be prioritized over non-GBR flows and may be dropped if the experienced latency crosses the delay bound. The packets crossing the latency bound should be considered as lost and count towards PER. |
| 3-255 | Reserved. |

In other aspects, the resource type field may include, and/or may be encoded using, any other additional and/or alternative values.

In some demonstrative aspects, information in the resource type field, e.g., resource type field 552 and/or resource type field 452 (FIG. 4), may be included, e.g., partially contained, in an Intra-Access Priority element. For example, the Intra-Access Priority element may be signaled with an SCS descriptor element, e.g., SCS descriptor element 400 (FIG. 4), for example, with the same SCS descriptor element, which includes the resource type field 552 and/or resource type field 452 (FIG. 4).

In one example, the Intra-Access Priority element to signal the resource type parameter value, e.g., as follows:

Alternate Queue set to 0—to signal non-GBR flow.

Alternate Queue set to 1 and Drop Eligibility set to 0—to signal GBR flow.

Alternate Queue set to 1 and Drop Eligibility set to 1—to signal Delay-critical GBR flow.

In some demonstrative aspects, an SCS descriptor element, e.g., SCS descriptor element 400 (FIG. 4), including a QoS characteristics element, e.g., Qos characteristics element 500, may include a new subelement, e.g., a vendor specific element or a 5G-QoS specific element.

In some demonstrative aspects, the new subelement, e.g., which may be included in vendor specific element 424 (FIG. 4), may include one or more cellular QoS parameters, which are not included in the QoS characteristics element, e.g., QoS characteristics element 500. For example, the new subelement may include one or more cellular QoS parameters, for example, a resource type value, a priority level, and/or a 5QI index value, e.g., as described above.

In some demonstrative aspects, an overall QoS characteristics for the cellular QoS traffic flow may be signaled, for example, by setting the new subelement, e.g., subelements 452, 454 and/or 456 (FIG. 4), along with the QoS characteristics element, e.g., QoS characteristics element 500, in a same SCS descriptor element, e.g., SCS descriptor element 400 (FIG. 4).

In some demonstrative aspects, interpretation of one or more fields in the QoS characteristics element, e.g., QoS characteristics element 500, may be determined and/or changed, for example, when the SCS descriptor element containing the QoS characteristics element, e.g., SCS descriptor element 400 (FIG. 4), includes one or more parameters, e.g., in the subelements 452, 454 and/or 456 (FIG. 4), corresponding to the cellular QoS traffic flow, e.g., a 3GPP QoS flow.

In one example, one or more fields in the QoS characteristics element may be interpreted as follows, for example, when the SCS descriptor element containing the QoS characteristics element, e.g., SCS descriptor element 400 (FIG. 4), includes one or more parameters, e.g., in the subelements 452, 454 and/or 456 (FIG. 4):

A minimum service interval field, e.g., Minimum Service Interval field 522, may be reserved or set to unspecified value.

A maximum service interval field, e.g., Maximum Service Interval field 521, may be reserved or set to unspecified value.

A minimum data rate field, e.g., Minimum Data Rate field 526, may be reserved or set to unspecified value.

Reference is made to FIG. 6, which schematically illustrates a method of communicating a cellular QoS index, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include setting, at a non-AP STA, a cellular QoS index value in a cellular QoS index field to indicate a predefined setting of a set of a plurality QoS parameters for a cellular QoS traffic flow to be communicated by the non-AP STA over a WLAN. For example, controller 154 (FIG. 1) may be configured to cause the non-AP STA implemented by device 140 (FIG. 1) to set the cellular QoS index value, e.g., the 5QI value, in the cellular QoS index field to indicate the predefined setting of the set of the plurality QoS parameters for the cellular QoS traffic flow to be communicated by the non-AP STA implemented by device 140 (FIG. 1) over the WLAN, e.g., as described above.

As indicated at block 604, the method may include transmitting an SCS request from the non-AP STA to an AP of the WLAN, the SCS request including an SCS descriptor element including the cellular QoS index. For example, controller 154 (FIG. 1) may be configured to cause the non-AP STA implemented by device 140 (FIG. 1) to transmit the SCS request to the AP, e.g., implemented by device 102 (FIG. 1), e.g., as described above.

Figure 7:
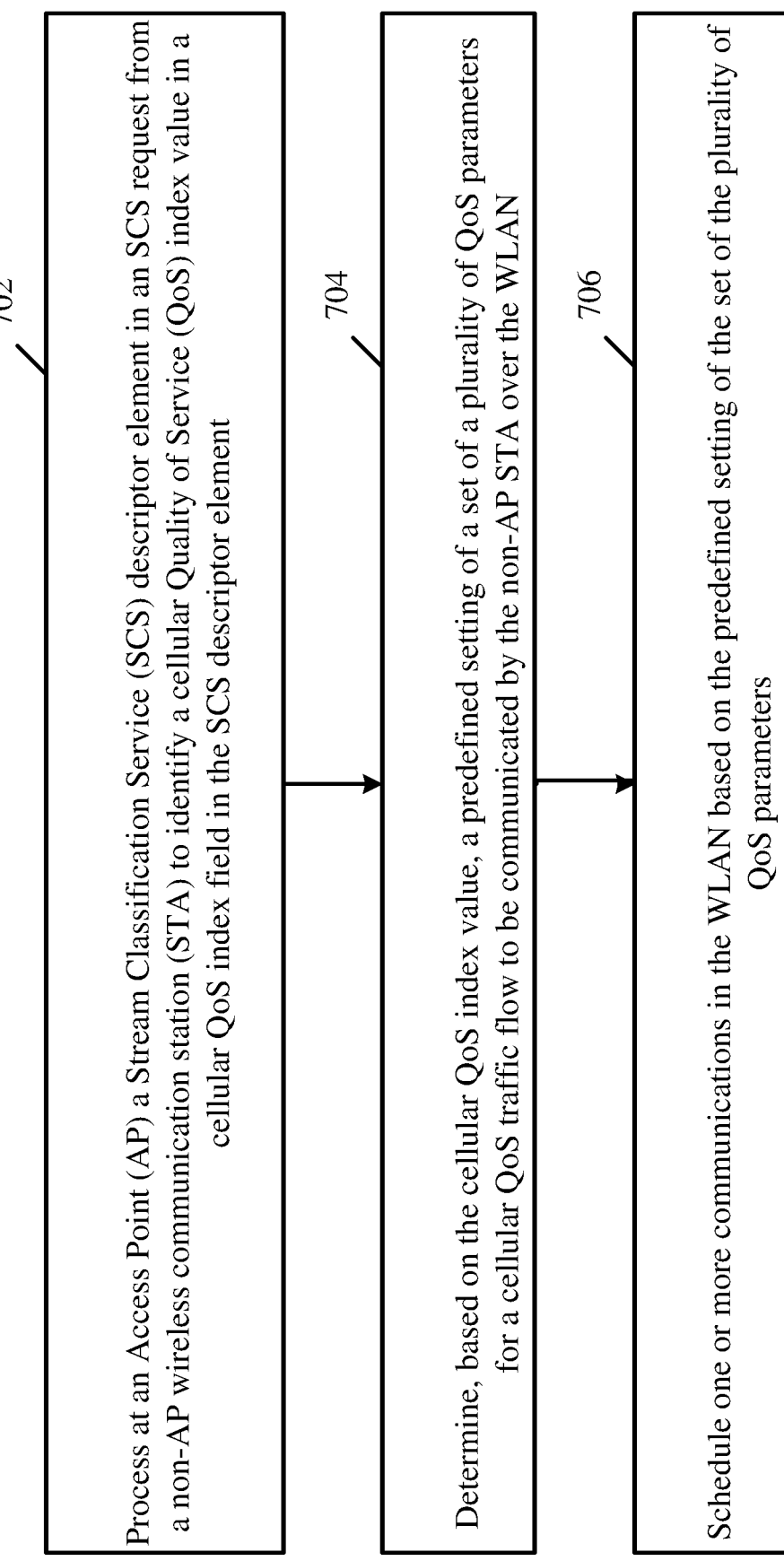
FIG. 7 is a schematic flow-chart illustration of a method of communicating cellular QoS information, in accordance with some demonstrative aspects.

Reference is made to FIG. 7, which schematically illustrates a method of communicating a cellular QoS index, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1), device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 702, the method may include processing at an AP an SCS descriptor element in an SCS request from a non-AP STA to identify a cellular QoS index value in a cellular QoS index field in the SCS descriptor element. For example, controller 124 (FIG. 1) may be configured to cause the AP implemented by device 102 (FIG. 1) to process the SCS descriptor element in the SCS request from the non-AP STA, e.g., implemented by device 140 (FIG. 1), to identify the cellular QoS index value in the cellular QoS index field in the SCS descriptor element, e.g., as described above.

As indicated at block 704, the method may include determining, based on the cellular QoS index value, a predefined setting of a set of a plurality QoS parameters for a cellular QoS traffic flow to be communicated by the non-AP STA over the WLAN. For example, controller 124 (FIG. 1) may be configured to cause the AP implemented by device 102 (FIG. 1) to determine, based on the cellular QoS index value, the predefined setting of the set of the plurality QoS parameters for the cellular QoS traffic flow to be communicated by the non-AP STA, e.g., implemented by device 140 (FIG. 1), over the WLAN, e.g., as described above.

As indicated at block 706, the method may include scheduling one or more communications in the WLAN based on the predefined setting of the set of the plurality QoS parameters. For example, controller 124 (FIG. 1) may be configured to cause the AP implemented by device 102 (FIG. 1) to schedule one or more communications in the WLAN based on the predefined setting of the set of the plurality QoS parameters, e.g., as described above.

Figure 8:
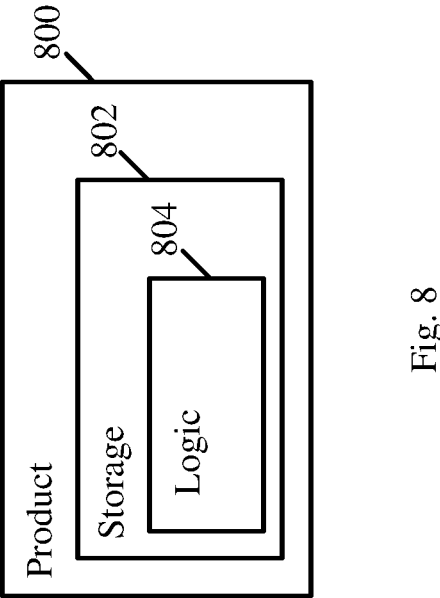
FIG. 8 is a schematic illustration of a product of manufacture, in accordance with some demonstrative aspects.

Reference is made to FIG. 8, which schematically illustrates a product of manufacture 800, in accordance with some demonstrative aspects. Product 800 may include one or more tangible computer-readable ("machine-readable") non-transitory storage media 802, which may include computer-executable instructions, e.g., implemented by logic 804, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1-7, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 800 and/or machine-readable storage media 802 may include one or more types of computer-readable storage media capable of storing data, including volatile memory, non-volatile memory, removable or non-removable memory, erasable or non-erasable memory, writeable or re-writeable memory, and the like. For example, machine-readable storage media 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EE-PROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication station (STA), e.g., a non Access Point (AP) (non-AP) STA, to set a cellular Quality of Service (QoS) index value in a cellular QoS index field to indicate a predefined setting of a set of a plurality QoS parameters for a cellular QoS traffic flow to be communicated by the non-AP STA over a Wireless Local Area Network (WLAN); and transmit a Stream Classification Service (SCS) request to an Access Point (AP) of the WLAN, the SCS request comprising an SCS descriptor element, the SCS descriptor element comprising the cellular QoS index field.

Example 2 includes the subject matter of Example 1, and optionally, wherein the SCS descriptor element comprises a vendor specific element, the vendor specific element comprising the cellular QoS index field.

Example 3 includes the subject matter of Example 2, and optionally, wherein the vendor specific element comprises at least one of a resource type field, or a priority field, wherein the resource type field is configured to indicate a resource type of the cellular QoS traffic flow, wherein the priority field is configured to indicate a priority of the cellular QoS traffic flow.

Example 4 includes the subject matter of Example 1, and optionally, wherein the SCS descriptor element comprises a QoS characteristics element, the QoS characteristics element comprising the cellular QoS index field.

Example 5 includes the subject matter of Example 4, and optionally, wherein QoS characteristics element comprises at least one of a resource type field, or a priority field, wherein the resource type field is configured to indicate a resource type of the cellular QoS traffic flow, wherein the priority field is configured to indicate a priority of the cellular QoS traffic flow.

Example 6 includes the subject matter of any one of Examples 1-5, and optionally, wherein the apparatus is configured to cause the non-AP STA to set a delay bound field based on a Packet Delay Budget (PDB) of the cellular QoS traffic flow, wherein the SCS descriptor element comprises a QoS characteristics element, the QoS characteristics element comprising the delay bound field.

Example 7 includes the subject matter of Example 6, and optionally, wherein the apparatus is configured to cause the non-AP STA to set a value in the delay bound field based on a subtraction result of subtracting a Core Network PDB (CN-PDB) from the PDB of the cellular QoS traffic flow.

Example 8 includes the subject matter of any one of Examples 1-7, and optionally, wherein the apparatus is configured to cause the non-AP STA to set a Medium Access Control (MAC) Service Data Unit (MSDU) delivery ratio field based on a Packet Error Rate (PER) of the cellular QoS traffic flow, wherein the SCS descriptor element comprises a QoS characteristics element, the QoS characteristics element comprising the MSDU delivery ratio field.

Example 9 includes the subject matter of Example 8, and optionally, wherein the apparatus is configured to cause the non-AP STA to set a value in the MSDU delivery ratio field according to a predefined mapping table, the mapping table configured to map a plurality of predefined PER values to a respective plurality of predefined MSDU delivery ratio values.

Example 10 includes the subject matter of any one of Examples 1-9, and optionally, wherein the apparatus is configured to cause the non-AP STA to set a minimum data rate field based on a Guaranteed Flow Bit Rate (GFBR) of the cellular QoS traffic flow, wherein the SCS descriptor element comprises a QoS characteristics element, the QoS characteristics element comprising the minimum data rate field.

Example 11 includes the subject matter of any one of Examples 1-10, and optionally, wherein the apparatus is configured to cause the non-AP STA to set a mean data rate field based on an average of a Guaranteed Flow Bit Rate (GFBR) and a Maximal Flow Bit Rate (MFBR) of the cellular QoS traffic flow, wherein the SCS descriptor element comprises a QoS characteristics element, the QoS characteristics element comprising the mean data rate field.

Example 12 includes the subject matter of any one of Examples 1-10, and optionally, wherein the apparatus is configured to cause the non-AP STA to set a resource type field in the SCS descriptor element to indicate a resource type of the cellular QoS traffic flow.

Example 13 includes the subject matter of Example 12, and optionally, wherein the apparatus is configured to cause the non-AP STA to set the resource type field to a value from a plurality of predefined resource type field values, the plurality of predefined resource type field values comprising a first resource type field value to indicate a Guaranteed Bit Rate (GBR) flow, a second resource type field value to indicate a non-GBR flow, and a third resource type field value to indicate a GBR-delay critical flow.

Example 14 includes the subject matter of any one of Examples 1-13, and optionally, wherein the set of the plurality QoS parameters comprises at least one of a resource type, a priority level, a Packet Delay Budget (PDB), a Packet Error Rate (PER), an averaging window, or a Maximum Data Burst Volume (MDBV).

Example 15 includes the subject matter of any one of Examples 1-14, and optionally, wherein the SCS descriptor element comprises an element identifier (ID) field, a length field after the element ID field, an SCS ID field after the length field, and a request type field after the SCSID field, wherein the cellular QoS index field is after the SCSID field.

Example 16 includes the subject matter of any one of Examples 1-15, and optionally, wherein the cellular QoS index field comprises a fifth generation (5G) QoS Index (5QI) field.

Example 17 includes the subject matter of any one of Examples 1-16, and optionally, comprising a radio to transmit the SCS request.

Example 18 includes the subject matter of Example 17, and optionally, comprising one or more antennas connected to the radio, and a processor to execute instructions of an operating system of the non-AP STA.

Example 19 includes an apparatus comprising logic and circuitry configured to cause an Access Point (AP) of a Wireless Local Area Network (WLAN) to process a Stream Classification Service (SCS) descriptor element in an SCS request from a non-AP wireless communication station (STA) to identify a cellular Quality of Service (QoS) index value in a cellular QoS index field in the SCS descriptor element; determine, based on the cellular QoS index value, a predefined setting of a set of a plurality QoS parameters for a cellular QoS traffic flow to be communicated by the non-AP STA over the WLAN; and schedule one or more communications in the WLAN based on the predefined setting of the set of the plurality QoS parameters.

Example 20 includes the subject matter of Example 19, and optionally, wherein the SCS descriptor element comprises a vendor specific element, the vendor specific element comprising the cellular QoS index field.

Example 21 includes the subject matter of Example 20, and optionally, wherein the vendor specific element comprises at least one of a resource type field, or a priority field, wherein the resource type field is configured to indicate a resource type of the cellular QoS traffic flow, wherein the priority field is configured to indicate a priority of the cellular QoS traffic flow.

Example 22 includes the subject matter of Example 19, and optionally, wherein the SCS descriptor element comprises a QoS characteristics element, the QoS characteristics element comprising the cellular QoS index field.

Example 23 includes the subject matter of Example 22, and optionally, wherein QoS characteristics element comprises at least one of a resource type field, or a priority field, wherein the resource type field is configured to indicate a resource type of the cellular QoS traffic flow, wherein the priority field is configured to indicate a priority of the cellular QoS traffic flow.

Example 24 includes the subject matter of any one of Examples 19-23, and optionally, wherein the apparatus is configured to cause the AP to determine a Packet Delay Budget (PDB) of the cellular QoS traffic flow based on a delay bound field in a QoS characteristics element in the SCS descriptor element.

Example 25 includes the subject matter of Example 24, and optionally, wherein a value in the delay bound field is based on a subtraction result of subtracting a Core Network PDB (CN-PDB) from the PDB of the cellular QoS traffic flow.

Example 26 includes the subject matter of any one of Examples 19-25, and optionally, wherein the apparatus is configured to cause the AP to determine a Packet Error Rate (PER) of the cellular QoS traffic flow based on a Medium Access Control (MAC) Service Data Unit (MSDU) delivery ratio field in a QoS characteristics element in the SCS descriptor element.

Example 27 includes the subject matter of Example 26, and optionally, wherein a value in the MSDU delivery ratio field is based on a predefined mapping table, the mapping table configured to map a plurality of predefined PER values to a respective plurality of predefined MSDU delivery ratio values.

Example 28 includes the subject matter of any one of Examples 19-27, and optionally, wherein the apparatus is configured to cause the AP to determine a Guaranteed Flow Bit Rate (GFBR) of the cellular QoS traffic flow based on a minimum data rate field in a QoS characteristics element in the SCS descriptor element.

Example 29 includes the subject matter of any one of Examples 19-28, and optionally, wherein the apparatus is configured to cause the AP to determine a Guaranteed Flow Bit Rate (GFBR) and a Maximal Flow Bit Rate (MFBR) of the cellular QoS traffic flow based on a mean data rate field in a QoS characteristics element in the SCS descriptor element.

Example 30 includes the subject matter of any one of Examples 19-29, and optionally, wherein the apparatus is configured to cause the AP to determine a resource type of the cellular QoS traffic flow based on a resource type field in the SCS descriptor element.

Example 31 includes the subject matter of Example 30, and optionally, wherein the resource type field comprises a value from a plurality of predefined resource type field values, the plurality of predefined resource type field values comprising a first resource type field value to indicate a Guaranteed Bit Rate (GBR) flow, a second resource type field value to indicate a non-GBR flow, and a third resource type field value to indicate a GBR-delay critical flow.

Example 32 includes the subject matter of any one of Examples 19-31, and optionally, wherein the set of the plurality QoS parameters comprises at least one of a resource type, a priority level, a Packet Delay Budget (PDB), a Packet Error Rate (PER), an averaging window, or a Maximum Data Burst Volume (MDBV).

Example 33 includes the subject matter of any one of Examples 19-32, and optionally, wherein the SCS descriptor element comprises an element identifier (ID) field, a length field after the element ID field, an SCS ID field after the length field, and a request type field after the SCSID field, wherein the cellular QoS index field is after the SCSID field.

Example 34 includes the subject matter of any one of Examples 19-33, and optionally, wherein the cellular QoS index field comprises a fifth generation (5G) QoS Index (5QI) field.

Example 35 includes the subject matter of any one of Examples 19-34, and optionally, comprising a radio to receive the SCS request.

Example 36 includes the subject matter of Example 35, and optionally, comprising one or more antennas connected to the radio, and a processor to execute instructions of an operating system of the AP.

Example 37 comprises a wireless communication device comprising the apparatus of any of Examples 1-36.

Example 38 comprises an apparatus comprising means for executing any of the described operations of any of Examples 1-36.

Example 39 comprises a product comprising one or more tangible computer-readable non-transitory storage media comprising instructions operable to, when executed by at least one processor, enable the at least one processor to cause a wireless communication device to perform any of the described operations of any of Examples 1-36.

Example 40 comprises an apparatus comprising: a memory interface; and processing circuitry configured to: perform any of the described operations of any of Examples 1-36.

Example 41 comprises a method comprising any of the described operations of any of Examples 1-36.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to cause an Access Point (AP) to:
process a Stream Classification Service (SCS) descriptor element in an SCS request from a wireless communication station (STA) to identify a fifth generation (5G) Quality of Service (QoS) Index (5QI) value in a 5QI field of the SCS descriptor element, wherein the 5QI value is to indicate a predefined setting of a plurality of cellular QoS parameters for a cellular QoS traffic flow to be communicated by the STA in a Wireless Local Area Network (WLAN); and
schedule one or more communications in the WLAN based on the 5QI value; and
a memory to store information processed by the processor.

2. The apparatus of claim 1 configured to cause the AP to identify a priority of the cellular QoS traffic flow based on a priority field in the SCS descriptor element.

3. The apparatus of claim 2, wherein the SCS descriptor element comprises a vendor specific element, the vendor specific element comprising the 5QI field and the priority field.

4. The apparatus of claim 1, wherein the SCS descriptor element comprises a WLAN QoS characteristics element before the 5QI field.

5. The apparatus of claim 4 configured to cause the AP to determine at least one cellular QoS parameter for the cellular QoS traffic flow based on at least one parameter field in the WLAN QoS characteristics element.

6. The apparatus of claim 1, wherein the SCS descriptor element comprises a vendor specific element, the vendor specific element comprising the 5QI field.

7. The apparatus of claim 1, wherein the plurality of cellular QoS parameters comprises at least one of a resource type, a priority level, a Packet Delay Budget (PDB), a Packet Error Rate (PER), an averaging window, or a Maximum Data Burst Volume (MDBV).

8. The apparatus of claim 1, wherein the SCS descriptor element comprises an element identifier (ID) field, a length field after the element ID field, an SCS ID (SCSID) field after the length field, and a request type field after the SCSID field, wherein the 5QI field is after the SCSID field.

9. The apparatus of claim 1 comprising a radio to receive the SCS request from the STA.

10. The apparatus of claim 9 comprising one or more antennas connected to the radio, and another processor to execute instructions of an operating system.

11. A product comprising one or more tangible computer-readable non-transitory storage media comprising instructions operable to, when executed by at least one processor, enable the at least one processor to cause an Access Point (AP) to:
process a Stream Classification Service (SCS) descriptor element in an SCS request from a wireless communication station (STA) to identify a fifth generation (5G) Quality of Service (QoS) Index (5QI) value in a 5QI field of the SCS descriptor element, wherein the 5QI value is to indicate a predefined setting of a plurality of cellular QoS parameters for a cellular QoS traffic flow to be communicated by the STA in a Wireless Local Area Network (WLAN); and
schedule one or more communications in the WLAN based on the 5QI value.

12. The product of claim 11, wherein the instructions, when executed, cause the AP to identify a priority of the cellular QoS traffic flow based on a priority field in the SCS descriptor element.

13. The product of claim 12, wherein the SCS descriptor element comprises a vendor specific element, the vendor specific element comprising the 5QI field and the priority field.

14. The product of claim 11, wherein the SCS descriptor element comprises a WLAN QoS characteristics element before the 5QI field.

15. The product of claim 14, wherein the instructions, when executed, cause the AP to determine at least one cellular QoS parameter for the cellular QoS traffic flow based on at least one parameter field in the WLAN QoS characteristics element.

16. The product of claim 11, wherein the SCS descriptor element comprises a vendor specific element, the vendor specific element comprising the 5QI field.

17. The product of claim 11, wherein the plurality of cellular QoS parameters comprises at least one of a resource type, a priority level, a Packet Delay Budget (PDB), a Packet Error Rate (PER), an averaging window, or a Maximum Data Burst Volume (MDBV).

18. The product of claim 11, wherein the SCS descriptor element comprises an element identifier (ID) field, a length field after the element ID field, an SCS ID (SCSID) field after the length field, and a request type field after the SCSID field, wherein the 5QI field is after the SCSID field.

19. An apparatus for an Access Point (AP), the apparatus comprising:

means for processing a Stream Classification Service (SCS) descriptor element in an SCS request from a wireless communication station (STA) to identify a fifth generation (5G) Quality of Service (QoS) Index (5QI) value in a 5QI field of the SCS descriptor element, wherein the 5QI value is to indicate a predefined setting of a plurality of cellular QoS parameters for a cellular QoS traffic flow to be communicated by the STA in a Wireless Local Area Network (WLAN); and means for scheduling one or more communications in the WLAN based on the 5QI value.

20. The apparatus of claim 19 comprising means for identifying a priority of the cellular QoS traffic flow based on a priority field in the SCS descriptor element.

* * * * *